(12) United States Patent
Reinhart et al.

(10) Patent No.: US 9,572,350 B2
(45) Date of Patent: Feb. 21, 2017

(54) BAKING PLATE FOR BAKING OVENS

(75) Inventors: Adam Reinhart, Vienna (AT);
Johannes Haas, Vienna (AT); Josef Haas, Leobendorf (AT); Stefan Jirascheck, Koenigsbrunn (AT); Manuel Lichtscheidl, Vienna (AT); Fritz Obermaier, Krems (AT)

(73) Assignee: Haas Food Equipment GmbH, Vienna (AT)

( * ) Notice: Subject to any disclaimer, the term of this patent is extended or adjusted under 35 U.S.C. 154(b) by 191 days.

(21) Appl. No.: 14/239,309

(22) PCT Filed: Aug. 17, 2012

(86) PCT No.: PCT/EP2012/066088
§ 371 (c)(1),
(2), (4) Date: Feb. 18, 2014

(87) PCT Pub. No.: WO2013/024152
PCT Pub. Date: Feb. 21, 2013

(65) Prior Publication Data
US 2014/0196611 A1     Jul. 17, 2014

(30) Foreign Application Priority Data
Aug. 18, 2011   (AT) ................ A 1190/2011

(51) Int. Cl.
| A21B 3/00 | (2006.01) |
| A47J 37/00 | (2006.01) |
| A21B 5/02 | (2006.01) |
| A21B 3/13 | (2006.01) |
| A21B 3/15 | (2006.01) |
| A47J 37/06 | (2006.01) |

(52) U.S. Cl.
CPC .............. *A21B 5/02* (2013.01); *A21B 3/132* (2013.01); *A21B 3/15* (2013.01); *A21B 5/023* (2013.01); *A47J 37/0611* (2013.01)

(58) Field of Classification Search
CPC ........ A47J 37/0611; A21B 5/023; A21B 5/02; A21B 5/026
USPC .......... 99/373, 374, 376, 377, 380, 381, 353
See application file for complete search history.

(56) References Cited

U.S. PATENT DOCUMENTS

| 1,374,522 A * | 4/1921 | Peterson .............. A47J 37/0611 99/376 |
| 2,314,872 A * | 3/1943 | Dickey ................ A47J 37/0611 99/340 |
| 2,358,452 A * | 9/1944 | Garstang .............. A47J 37/0611 425/188 |

(Continued)

FOREIGN PATENT DOCUMENTS

| DE | 4208382 A1 | 9/1993 |
| DE | 602004000582 T2 | 1/2007 |

(Continued)

*Primary Examiner* — Reginald L Alexander
(74) *Attorney, Agent, or Firm* — Laurence A. Greenberg; Werner H. Stemer; Ralph E. Locher (57) ABSTRACT

A baking plate for a baking oven for producing baked products such as soft waffles, crispy wafers, pancakes and the like. The baking plate has a carrier plate and one or more baking inserts disposed thereon, which are configured for receiving the batter to be baked. The baking inserts are formed from sintered ceramic that are very sturdy and tough and have low thermal expansion.

18 Claims, 5 Drawing Sheets

(56) References Cited

U.S. PATENT DOCUMENTS

| | | | | |
|---|---|---|---|---|
| 4,417,508 A | * | 11/1983 | Haas, Sr. ................. | A21B 5/02 |
| | | | | 432/242 |
| 4,503,759 A | * | 3/1985 | Haas, Sr. ............... | A21B 5/023 |
| | | | | 249/179 |
| 8,671,830 B2 | * | 3/2014 | Lamont ................... | A47J 37/06 |
| | | | | 99/349 |
| 2004/0221743 A1 | | 11/2004 | Park et al. | |
| 2009/0114796 A1 | | 5/2009 | Lin | |

FOREIGN PATENT DOCUMENTS

| | | |
|---|---|---|
| DE | 202010009320 U1 | 9/2010 |
| FR | 2905824 A1 | 3/2008 |
| WO | 2011000015 A1 | 1/2011 |

* cited by examiner

BAKING PLATE FOR BAKING OVENS

BACKGROUND OF INVENTION

Field of Invention

The invention relates to baking plates for baking ovens for producing baked products such as soft waffles, crispy wafers, pancakes and the like. Such baking ovens in the designs for industrial production of baked products usually comprise an input station, a baking chamber, an output station and a conveying device for the baking plates which are disposed along an orbit leading through the baking chamber. Baking ovens of this type are used for the production of very different products. One group of products comprises Scotch pancakes, pancakes etc. Another group of products comprises soft waffles, American pancakes, Canadian pancakes etc. A further group of products comprises crispy-brittle wafers such as, for example, crispy-brittle wafer sheets, crispy-brittle flat wafers containing numerous hollow body halves etc. Furthermore, these baking ovens can also be used to produce packaging parts produced according to wafer baking technology such as sheets, cups etc. Furthermore, there are also groups of products comprising crispy-brittle wafers produced from flat wafers which are plastically deformable in the warm baking state, which are formed into hollow bodies in the warm baking state and then allowed to solidify as hollow bodies.

In such baking ovens, the heat required for the baking process in the baking chamber can be produced in various ways, for example, by gas heating, electrical heating or by electrical induction.

In baking ovens and the appurtenant baking plates it is important to ensure the optimal baking conditions over the longest possible time and if possible over the entire running time of the baking oven. For the baking process an amount of heat which always remains the same must be supplied to the batter, the baked products must be produced true to size for many applications and the baked product and any out-of-specification parts along with the baked products must be easily detachable and removable. In particular, the removal of misbaked products and contaminants is a problem in conventional baking plates which usually consist of grey cast iron with a machined and possibly quenched and tempered surface. An impurity which has not been removed or which cannot be removed can make all subsequently baked products unusable which usually results in the baking oven coming to a standstill and associated interruption of production.

In order to avoid these difficulties, it has already been proposed previously to configure the surface of baking plates so that the batter and the baking products formed therefrom can be released as easily as possible from the surface. DE 42 08 382 A1 discloses the coating of baking plates for baking wafer sheets where the baking plate consists of steel or cast steel and is provided with a smooth ceramic cover layer suitable for food use. It is further disclosed there to provide a plastic layer suitable for food use over the ceramic cover layer. However, such a large-area coating is disadvantageous. On the one hand, a large-area ceramic coating of metal plates is problematical during production. This applies both with regard to the dimensional accuracy and also the stability of the ceramic surface. During operation in a baking oven, splitting of ceramic coatings and formation of rejects occurs. Furthermore, the additional coating with plastic suitable for food use is counter-productive since the possibly attainable advantages of a ceramic surface are lost. In addition, the said document gives no information on the nature of the ceramic layer. In this respect the disclosure is incomplete.

Furthermore, it has been known for a long time to form baking molds from ceramic, where this usually comprises clay-containing ceramic. Such ceramic crockery which has been known for thousands of years is completely unusable for an industrial baking process.

DE 60 2004 000 582 T2 describes a baking mold with ceramic anti-stick coating where this comprises a bread baking machine. The anti-stick coating comprises a ceramic layer sintered at lower temperatures which is applied to a thin-walled baking mold made of metal. If the ceramic layer is damaged, the entire baking mold must be discarded. Any pressure loading by the baked product cannot be absorbed by such baking molds which is not necessary with pressure-free baking of bread. This document also gives no information on the type of sinter material so that the disclosure is incomplete in this respect. The disclosed bread baking mold gives no suggestion as to how a baking plate for wafer production should be formed.

The described disadvantages of the prior art should be eliminated according to the present invention. In particular, a baking plate for industrial baking ovens is to be provided from which after the baking process, the baking product can be removed easily and safely without any residue and where in the subsequent cleaning steps such as, for example, blasting with compressed air, all baking residue can be reliably removed. Surface treatments such as greasing or additional coatings should be avoided. Furthermore, any retrofitting of the baking plate or any repair should be possible easily and rapidly. Furthermore, it is an object to make the baking inserts such that the heat transport inside the baking plate to the baked product is ensured uniformly and at sufficient speed.

The baking plate mentioned initially is characterized in that the baking plate comprises a carrier plate and one or more baking inserts disposed thereon, which are configured for receiving the batter to be baked and that the baking inserts are formed from sintered ceramic having a high toughness and low thermal expansion. The baking inserts are preferably inserted in insertion recesses of the carrier plate and the carrier plate is formed from a material, preferably metal, particularly preferably grey cast iron, whose thermal expansion is the same or greater than the thermal expansion of the baking inserts. The baking inserts can have a coefficient of thermal expansion $\alpha < 9$ $[10^{-6} \times k^{-1}]$ and the carrier plate can have a coefficient of thermal expansion $\alpha > 9$ for the temperature range of 20 to 200° C. Preferably the baking inserts have a coefficient of thermal expansion of about 3.2 and the carrier plate has a coefficient of thermal expansion of about 12.5.

BRIEF SUMMARY OF THE INVENTION

The baking inserts according to the invention are preferably formed from silicon nitride or silicon carbide, particularly preferably of gas-pressure-sintered silicon nitride of the Al/Y type. According to further features, the insertion recesses in the carrier plate can be configured to receive the baking inserts with slight play so that the baking inserts can be inserted in a precisely fitting manner and removed again. Furthermore, the baking inserts on the baking surface side can be provided with the surface configuration desired for the baking product and a circumferential sealing rib as well as a circumferential side edge. The baking inserts are preferably held firmly in the insertion recesses by lugs which are firmly connected to the carrier plate, preferably by screw bolts and are arranged to overlap the side edge of the baking inserts. The side edge has an edge recess for each lug where for each baking insert at least two, preferably three or more lugs and edge recesses are provided. The lugs can be formed from metal, preferably from stainless steel.

According to further features of the invention, each insertion recess has a ventilation hole. The baking plates of a baking tong can be disposed in respectively one supporting framework where the lower and upper supporting framework are connected to one another by means of a joint.

Furthermore, the baking plate can be part of a baking plate tong comprising a lower and an upper baking plate, where the baking inserts thereof are arranged opposite one another so that after closing the baking tongs between the baking inserts assigned to one another, the space for the batter and for the baking product formed therefrom is formed. The invention further lies in the provision of a baking oven with an orbit for the baking plates leading through the baking chamber and a conveying device for the baking plates, which have one or more of the aforesaid features.

BRIEF DESCRIPTION OF THE SEVERAL VIEWS OF THE DRAWINGS

The invention is described in detail hereinafter as an example.

DESCRIPTION OF THE INVENTION

Figure 1:
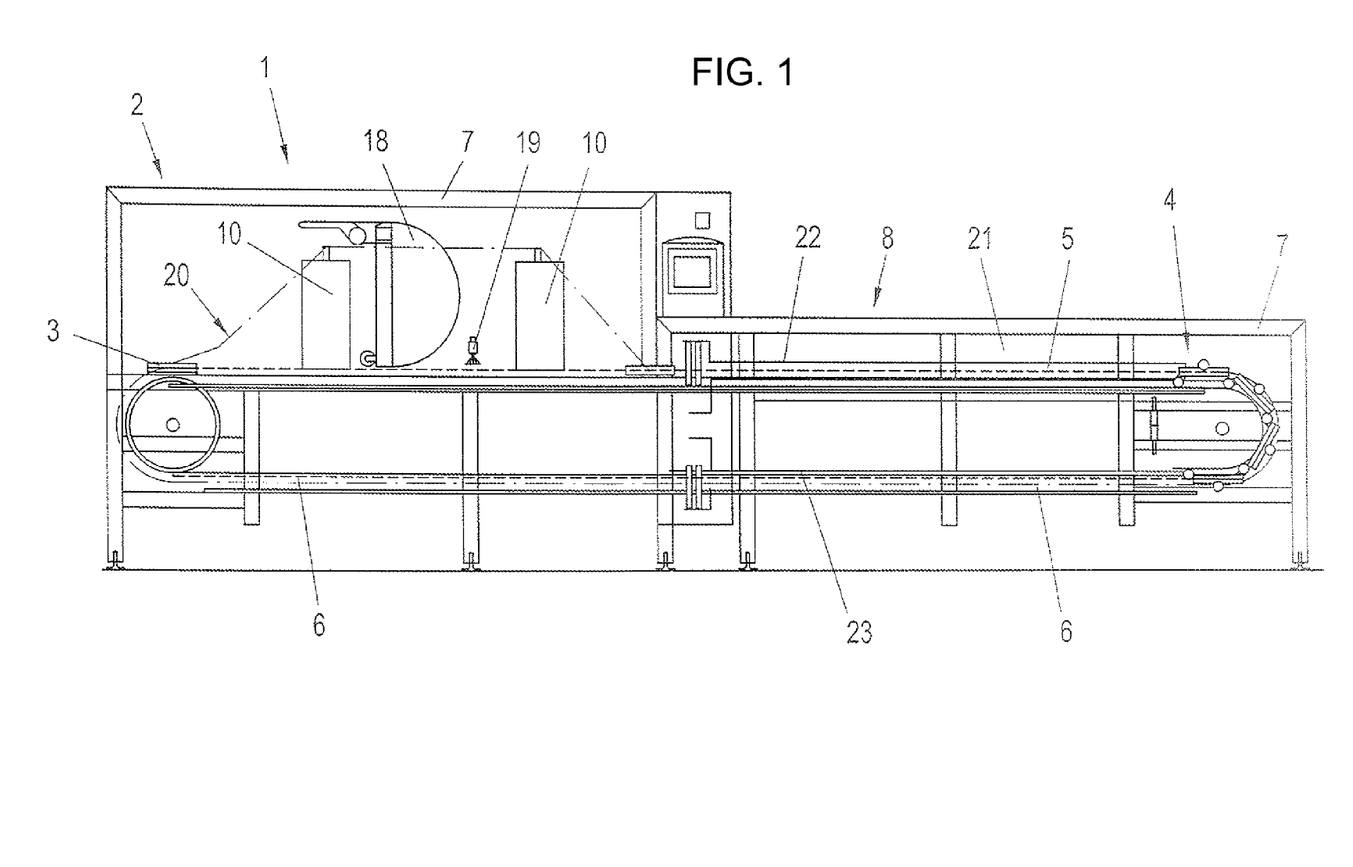
FIG. 1 is a schematic side view of a baking oven such as can be used here.

FIG. 1 shows a baking oven 1 for producing baked shaped bodies which, for example, are configured as soft waffles. The soft waffles are produced from a liquid waffle batter in baking molds which each consist of a lower baking mold and an upper baking mold which according to the invention are formed by baking inserts in the baking plates as will be shown subsequently. The baking molds are accommodated in the baking tongs 3 of an endless baking tong chain 4. The baking tong chain 4 is disposed along an orbit which extends in two superposed horizontal transport paths 5, 6 through the baking oven 1. The baking tong chain 4 is integrated in a chain conveyor disposed along the orbit which conveys the baking tongs 3 through both transport paths 5, 6 and deflects them from one transport path into the other by means of its chain wheels disposed at the front and rear end of the baking oven 1. A more detailed description of such baking ovens can be deduced, for example, from WO/2009/100873.

The chain conveyor is disposed in the elongate oven frame 7 of the baking oven 1 between side walls of the oven frame 7. The baking tongs 3 are disposed in the chain conveyor between two lateral transport chains and fastened to the chain lugs. Pivot bolts project outwards from the transport chains on which running wheels are rotatably mounted by which means the chain conveyor is supported in both transport paths in each case on running rails running in the longitudinal direction of the oven, the running rails being fastened to the two side walls of the oven frame 7. Located in the front oven half 2 on the upper transport path 5 are a discharge station 18, an input station 19 and a device 20 for opening and closing the baking tongs 3. In the discharge station 18 the soft waffles are removed from the opened baking tongs 3. In the input station 19 waffle batter, e.g. in liquid form or as solid dough is introduced into the opened baking tongs 3. After the input station 19, the baking tongs 3 are closed again by the device 20. The closed baking tongs 3 are conveyed by the chain conveyor in the upper transport path 5 towards the rear to the rear end of the baking oven 1 and in the lower transport path 6 towards the front to the front end of the baking oven 1. The baking chamber 21 of the baking oven 1 is accommodated in the rear oven half 8. In the baking chamber 21 an upper baking zone 22 is disposed on the upper transport path 5 and a lower baking zone 23 is disposed on the lower transport path 6.

Figure 2:
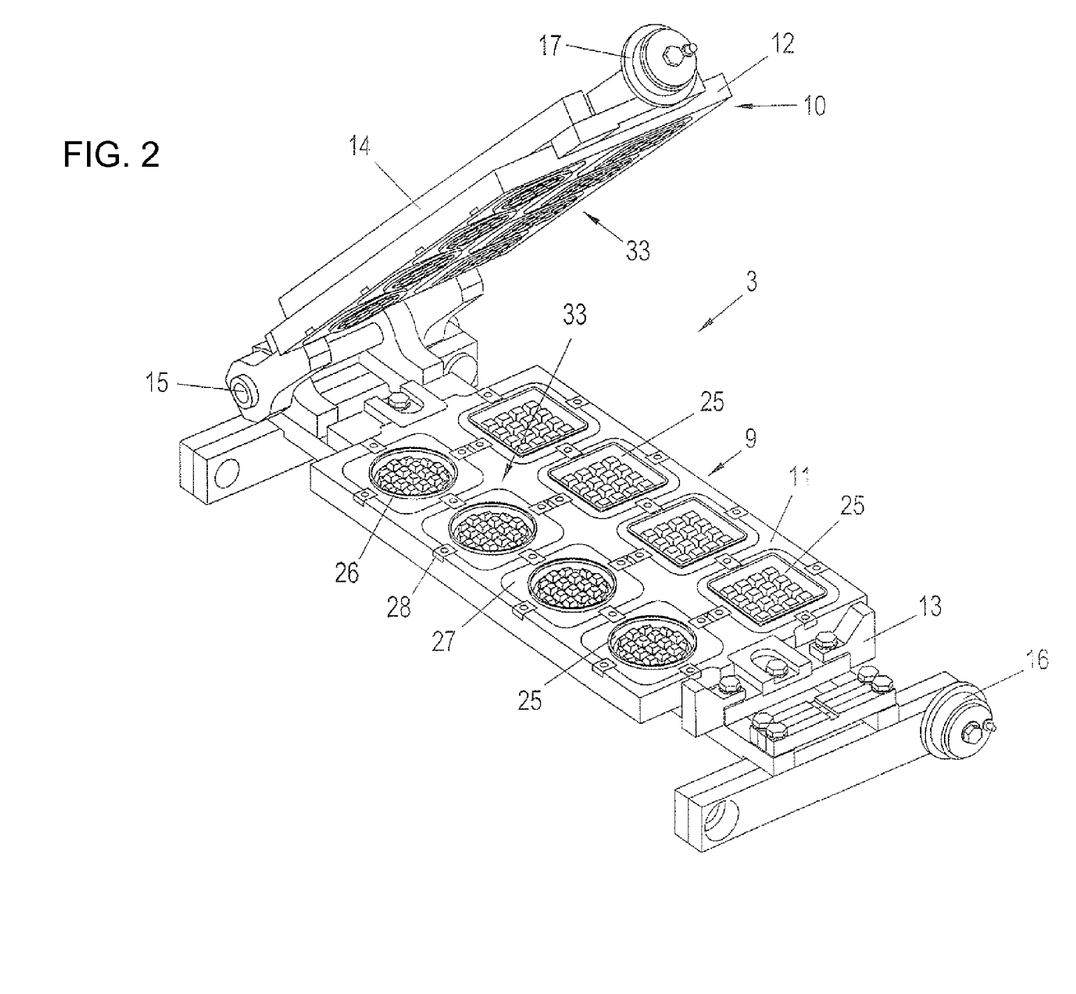
FIG. 2 shows an oblique view of a baking tong in the opened state.

FIG. 2 shows a baking tong 3 according to the invention as can be used in an oven according to FIG. 1 or in other baking ovens. The baking tong 3 comprises a lower baking plate 9 and an upper baking plate 10. The two baking plates each comprise a carrier plate, namely the lower carrier plate 11 and the upper carrier plate 12. The carrier plates 11, 12 are clamped in carrier frames 13, 14 which are hinged by means of the joint 15. The opened position of the baking tong is shown and in this position the batter can be applied to the lower baking plate or the finished baking product can be removed after passing through the baking chamber. In the opened state the baking tong is cleaned of any baking residues, e.g. with compressed air.

For the rolling of the baking tongs in conjunction with the baking tong chain, respectively two rollers 16 are provided on both sides of the baking tong, of which only one can be seen in FIG. 2. The folding movement of the baking tong is controlled by means of the control roller 17 on the upper baking plate which is controlled by the device 20 for opening and closing.

As can already be seen in FIG. 2 and as is shown in detail in FIGS. 3 to 9, the carrier plates 11, 12, which for example are formed from a solid grey cast iron plate or steel plate, have insertion recesses 24 in which the baking inserts 25 are inserted. The insertion recesses and the baking inserts are configured with respect to one another with little or no play so that the baking inserts can be inserted in a precisely fitting manner and preferably also removed again. Each baking insert has the surface shape desired for the respective baking product on the baking surface side 33 and a circumferential sealing rib 26. The region inside the sealing rib forms the baking mold 34 for receiving the batter. In each case, a circumferential side edge 27 extends outwards, which lies largely flat in the baking surface side of the carrier plate 11, 12. The baking inserts 25 are held by lugs 28 which are screwed onto the carrier plate by means of screw bolts 29 and engage in an edge recess 30 of the baking insert. The lugs 28 are further recessed in corresponding recesses 31 of the carrier plate so that overall a largely flat surface is produced.

In the exemplary embodiments shown, each baking insert is held firmly by four lugs. Depending on the spatial and force requirements, two or three lugs may be sufficient or more lugs may be provided.

If various baking molds are shown on a carrier plate in the baking plates according to FIGS. 3 to 9, i.e. a row of round baking molds and a row of square baking molds, this is merely intended to illustrate that the shape of the baking produced and the appurtenant baking molds can be selected arbitrarily. In practical use it will be advantageous to always provide only one spatial configuration of the baking molds for all the baking tongs on the same baking tong chain.

Figure 3:
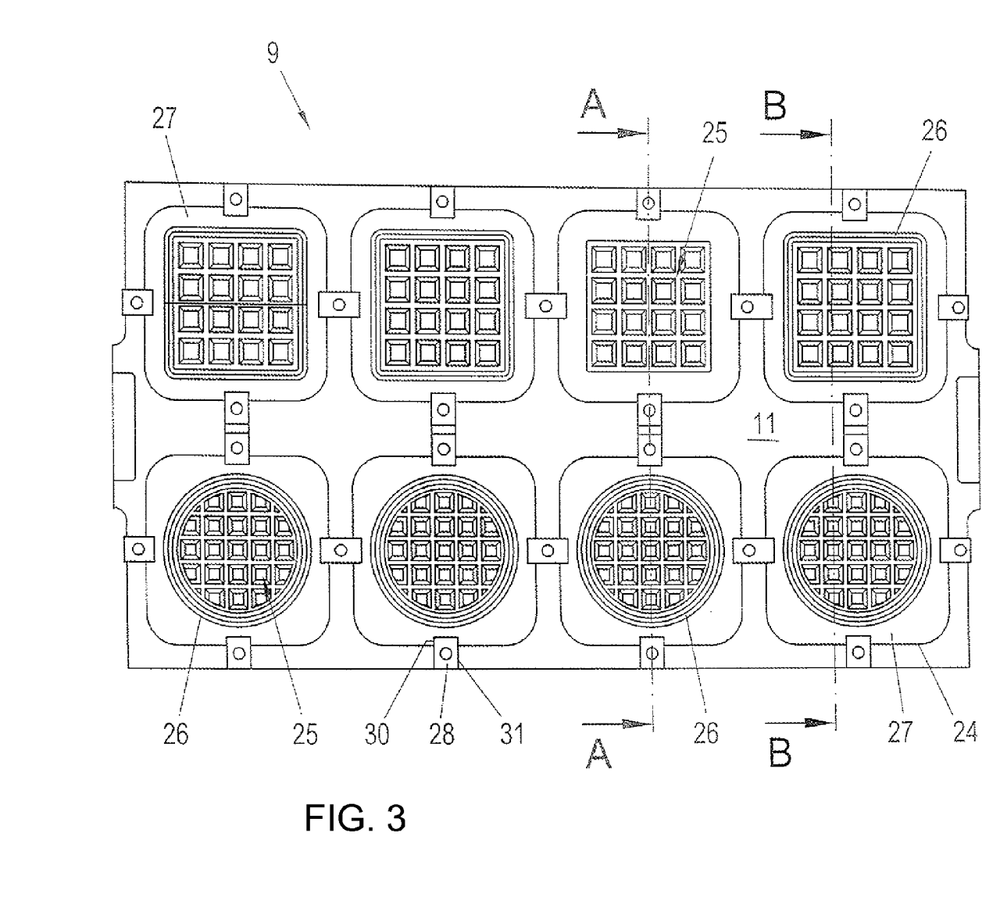
FIG. 3 shows a plan view of the baking surface of a lower baking plate.
Figure 4:
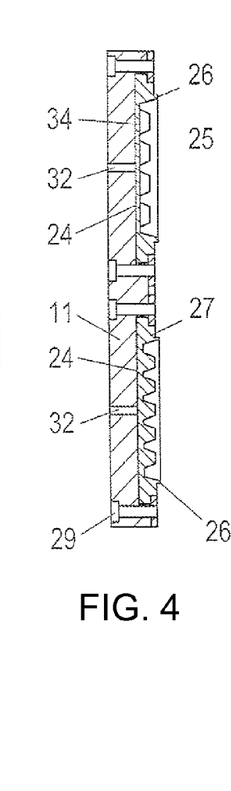
FIGS. 4 and 5 show sectional views according to the sections A-A and B-B in FIG. 3.
Figure 5:
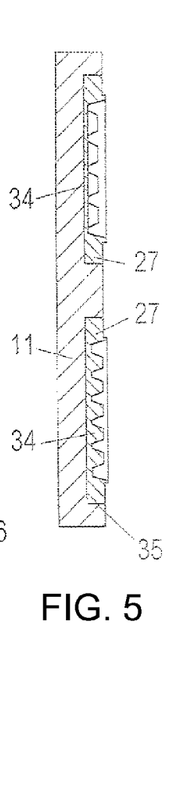
Figure 6:
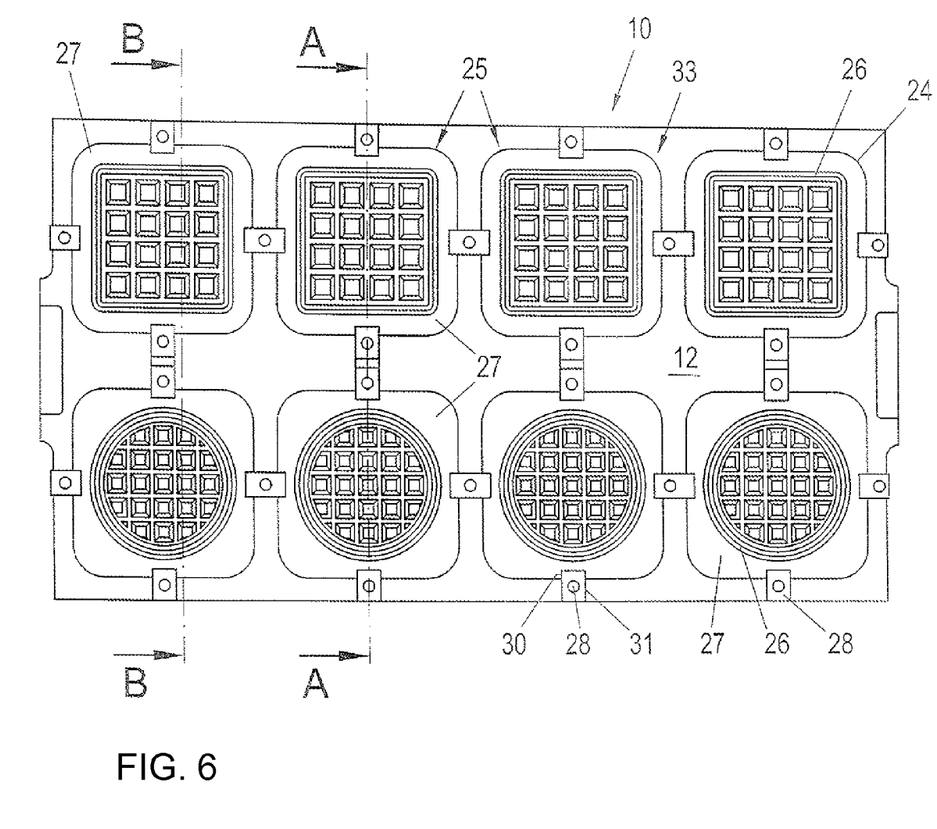
FIG. 6 shows a plan view of the baking surface of an upper baking plate.
Figure 7:
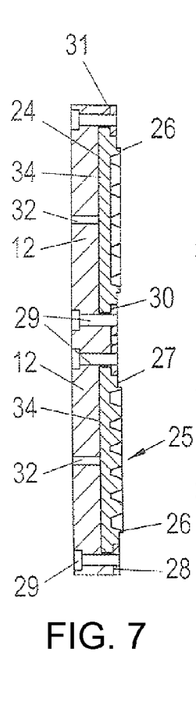
FIGS. 7, 8 show sectional views according to the lines of intersection A-A, B-B in FIG. 6.
Figure 8:
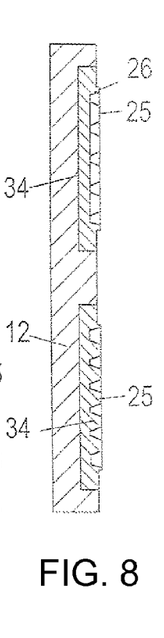

The upper baking plate shown in FIGS. 6 to 8 is configured to be largely the same as the lower baking plate according to FIGS. 3 to 5. A difference here is the engraving of the baking mold which protrudes with respect to the baking surface side of the carrier plate in the upper baking plate whereas the baking mold according to FIGS. 4 and 5 is set back. As a result of this difference, the spatial shape of the closed baking mold required for the baking process is formed, which receives the batter and the baked product. The shape of the baking mold can be arbitrarily adapted to the requirements and therefore deviate from this exemplary embodiment.

Figure 9:
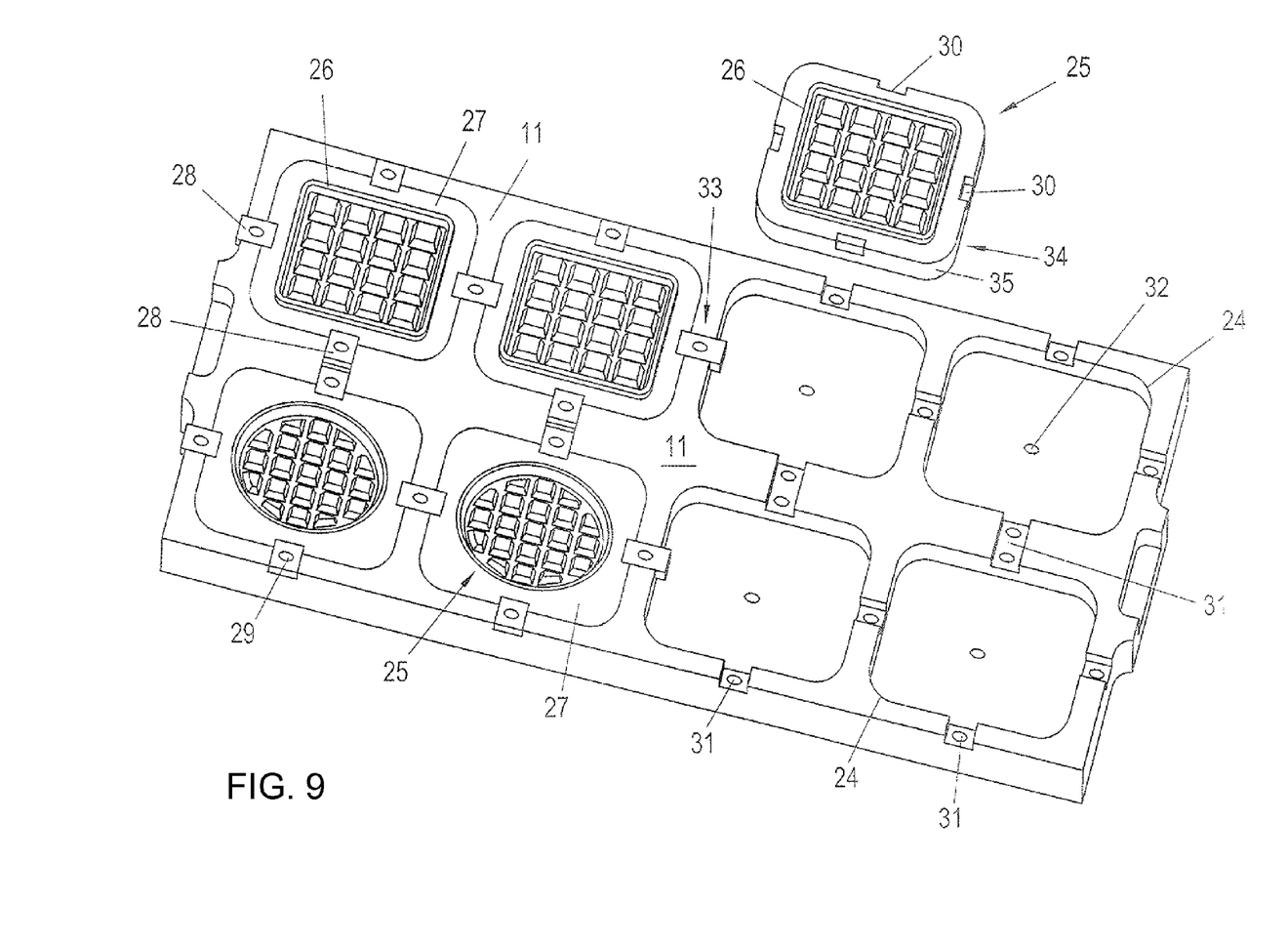
FIG. 9 shows a view of the lower baking plate with partially inserted baking inserts and partially empty insertion recesses.

As can be deduced from FIG. 9 in particular, the insertion recesses 24 have ventilation holes 32 which on the one hand facilitate the insertion of the precisely fitting baking inserts and on the other hand also afford the possibility of pressing out the baking inserts from the recess by means of a rod-shaped tool and therefore afford the possibility of exchanging damaged baking inserts or retrofitting the carrier plate for other baking inserts.

For good heat transfer from the solid carrier plate to the baking insert it is advantageous if its shape is matched exactly to the insertion recess, that therefore all the surfaces of the baking insert lying in the carrier plate abut against corresponding surfaces of the insertion recess. Furthermore, it can be advantageous if the wall thicknesses of the baking inserts are small, in particular those of the base surface 34.

The external contour of the baking inserts can also be different from the round or square shape shown here. The shaping of the baking inserts and the appurtenant insertion recesses can also deviate in cross-section from the shape shown. For example, the angle between the side surfaces 35 and the base surface 34 can also differ from 90°, in particular it can have an angle >90°. The shape of the insertion recess must be adapted to ensure a good heat flow.

According to the invention, the baking inserts are formed from sintered ceramic having high toughness and low thermal expansion. They preferably consist of silicon nitride or silicon carbide and particularly preferably of gas-pressure-sintered silicon nitride of the type Al/Y. The baking inserts should have a coefficient of thermal expansion $\alpha < 9[10^{-6} \times K^{-1}]$ relative to the temperature range of 20 to 200° C.

A sintered product having the following data has proved advantageous in practice:

Chemical Composition:

| | |
|---|---|
| $Si_3N_4$ | 90% |
| —$Al_2O_3$ | 6% |
| $Y_2O_3$ | 4% |

Structure:

| | |
|---|---|
| Gross density | 3.21 [g/cm$^3$] |
| Open porosity | 0 [%] |
| Grain size | 1-10 [μm] |

Of the Mechanical Properties the Following should be Stressed:

| | |
|---|---|
| Fracture toughness | 8 [Mpam$^{1/2}$] |
| Modulus of elasticity | 320 [GPa] |
| Poisson ratio | 0.28 |

Thermal Properties:

| | |
|---|---|
| Thermal conductivity (20° C.) | 30 [W/mK] |
| Coefficient of thermal expansion α (–1000° C.) | [10$^{-6}$ K$^{-1}$] |

The baking inserts are produced from this material according to the prior art for gas-pressure sintered silicon nitride.

Other industrial ceramics can also be used to produce baking inserts such as, for example, silicon carbide which has comparatively good properties for the baking process. The disadvantage of silicon carbide ceramic however lies in the higher brittleness with the associated higher risk of fracture. Grey cast iron having the designation EN-GJS-400-15 was used to produce the carrier plates. This material has a somewhat higher thermal conductivity of 36.2 (W/MK) (300° C.) and also the coefficient of thermal expansion α is higher being 12.5 ($10^{-6} \times K^{-1}$). As a result of this higher coefficient of thermal expansion, it is ensured that the baking insert is not damaged at the baking temperatures occurring in the oven since it has sufficient space for is thermal expansion, where its coefficient of thermal expansion is extremely low.

REFERENCE LIST

1 Baking oven
2 Front oven half
3 Baking tong
4 Baking tong chain
5 Transport path, upper
6 Transport path, lower
7 Oven frame
8 Rear oven half
9 Lower baking plate
10 Upper baking plate
11 Lower carrier plate
12 Upper carrier plate
13 Lower carrier frame
14 Upper carrier frame
15 Joint
16 Roller
17 Control roller
18 Discharge station
19 Input station
20 Device for opening and closing the baking tongs
21 Baking chamber
22 Upper baking zone
23 Lower baking zone
24 Insertion recess
25 Baking insert
26 Sealing rib
27 Side wall
28 Lugs
29 Screw bolt
30 Edge recess
31 Recess
32 Ventilation hole
33 Baking surface side
34 Base surface
35 Side surface.

The invention claimed is:

1. A baking plate for a baking oven for producing baked products (e.q., soft waffles, crispy wafers, pancakes, etc.), the baking plate comprising:
a carrier plate and one or more baking inserts disposed on said carrier plate and configured for receiving a batter to be baked in the baking oven, said baking inserts being formed from sintered ceramic having a high degree of toughness and a low coefficient of thermal expansion, said carrier plate formed with insertion recesses, said baking inserts inserted in said insertion recesses; and said carrier plate formed from a material having a coefficient of thermal expansion equal to or greater than the coefficient of thermal expansion of said baking inserts; and
lugs connected to said carrier plate and disposed to overlap side edges of said baking inserts for holding said baking inserts firmly in said insertion recesses;
wherein said side edge of each said baking inserts is formed with an edge recess for each lug.

2. The baking plate according to claim 1, wherein said carrier plate is formed of grey cast iron.

3. The baking plate according to claim 1, wherein said carrier plate is a part of a baking tong having lower and upper baking plates and wherein said carrier plate with said baking tong is movable through an input station, a heated baking chamber, and an output station of the baking oven.

4. The baking plate according to claim 1, wherein said baking inserts have a coefficient of thermal expansion $\alpha < 9$ $[10^{-6} \times k^{-1}]$ and said carrier plate has a coefficient of thermal expansion $\alpha > 9$ $[10^{-6} \times k^{-1}]$ for the temperature range of 20 to 200° C.

5. The baking plate according to claim 1, wherein said baking inserts have a coefficient of thermal expansion of about 3.2 and said carrier plate has a coefficient of thermal expansion of about 12.5 $[10^{-6} \times k^{-1}]$.

6. The baking plate according to claim 1, wherein said baking inserts are formed from a material selected from the group consisting of silicon nitride and silicon carbide.

7. The baking plate according to claim 6, wherein said baking inserts are formed of gas pressure sintered silicon nitride of type Al/Y.

8. The baking plate according to claim 1, wherein said insertion recesses in said carrier plate are formed to receive said baking inserts with small play for enabling an insertion and removal of said baking inserts with a precise fit.

9. The baking plate according to claim 1, wherein said baking inserts have a baking surface side formed with a surface configuration desired for the baking product, and a circumferential sealing rib and a circumferential side edge.

10. The baking plate according to claim 1, wherein said lugs connected to said carrier plate by screw bolts.

11. The baking plate according to claim 1, wherein said lugs are formed of metal.

12. The baking plate according to claim 11, wherein said lugs are formed of stainless steel.

13. The baking plate according to claim 3, wherein said baking plates of a baking tong are disposed in respectively one supporting frame, and wherein a lower supporting frame and an upper supporting frame are interconnected by way of a joint.

14. The baking plate according to claim 1, wherein said baking plate is part of a baking plate tong having a lower baking plate and an upper baking plate, wherein said baking inserts are disposed opposite one another so that, after closing said baking tongs, a space for the batter and for the baking product formed therefrom is formed between mutually cooperating baking inserts.

15. A baking oven, comprising an orbit track for baking plates circulating through a baking chamber and a conveying device for conveying respective baking plates according to claim 1 along said orbit track.

16. The baking plate according to claim 1, wherein said baking inserts consist of said sintered ceramic.

17. A baking plate for a baking oven for producing baked products (e.g., soft waffles, crispy wafers, pancakes, etc.), the baking plate comprising:
a carrier plate and one or more baking inserts disposed on said carrier plate and configured for receiving a batter to be baked in the baking oven, said baking inserts being formed from sintered ceramic having a high degree of toughness and a low coefficient of thermal expansion, said carrier plate formed with insertion recesses, said baking inserts inserted in said insertion recesses; and said carrier plate formed from a material having a coefficient of thermal expansion equal to or greater than the coefficient of thermal expansion of said baking inserts; and
lugs connected to said carrier plate and disposed to overlap side edges of said baking inserts for holding said baking inserts firmly in said insertion recesses;
wherein a plurality of lugs (two, preferably three or four lugs) and edge recesses are provided for each said baking insert.

18. A baking plate for a baking oven for producing baked products (e.g., soft waffles, crispy wafers, pancakes, etc.), the baking plate comprising:
a carrier plate and one or more baking inserts disposed on said carrier plate and configured for receiving a batter to be baked in the baking oven, said baking inserts being formed from sintered ceramic having a high degree of toughness and a low coefficient of thermal expansion, said carrier plate formed with insertion recesses, said baking inserts inserted in said insertion recesses; and said carrier plate formed from a material having a coefficient of thermal expansion equal to or greater than the coefficient of thermal expansion of said baking inserts; and
lugs connected to said carrier plate and disposed to overlap side edges of said baking inserts for holding said baking inserts firmly in said insertion recesses;
wherein each said insertion recess is formed with a ventilation hole.

* * * * *